United States Patent Office 3,522,070
Patented July 28, 1970

3,522,070
AQUEOUS COATING COMPOSITIONS CONTAINING DISPERSED SUBMICRON CELLULOSIC POLYMER PARTICLES AND THE PROCESS OF PREPARING SAID COATING COMPOSITIONS
William B. Webb, Jr., Pennsville, N.J., assignor to E. I. du Pont de Nemours and Company, Wilmington, Del., a corporation of Delaware
No Drawing. Continuation-in-part of application Ser. No. 427,163, Jan. 21, 1965. This application June 1, 1966, Ser. No. 554,361
Int. Cl. C08b 21/12, 21/14, 29/34
U.S. Cl. 106—170             7 Claims

ABSTRACT OF THE DISCLOSURE

Water-borne coating compositions having dispersed submicron particles containing cellulosic polymer, particularly nitrocellulose.

---

This application is a continuation-in-part of my copending application, Ser. No. 427,163 filed Jan. 21, 1965, now abandoned, which, in turn, is a continuation-in-part of copending application, Ser. No. 347,661 filed Feb. 27, 1964, now abandoned.

Water-borne coating compositions using synthetic resins, such as the acrylic polymers, as film forming agents have been widely used in the past few years because of the many advantages of such systems. These advantages include the elimination of most all of the flammable organic solvents, lack of necessity for recovery of these volatile organic solvents when applying the coatings in industry, and an increase in amount of coating which can be applied at one time. All of these advantages result in a safer system to handle, and greatly improved economics. However, heretofore no highly satisfactory water-borne coating compositions containing cellulosic derivatives as the principal film forming agents have been available. As shown, for example, in U.S. Pat. 2,105,155; 2,272,152 and 2,510,834 aqueous emulsion cellulosic coating compositions have been prepared. However, in general, such compositions contain large proportions of volatile organic solvents. Inherently such solvents make such compositions more expensive and less safe than compositions free from such solvents.

This invention provides aqueous cellulosic coating compositions which do not require volatile organic solvents, which have a high solids concentration, which form tough, blush-resistant films and which, in general, are safe, inexpensive and easy to apply. The improvement of this invention also provides a unique basic coating dispersion, which can be formulated into a wide variety of finished compositions having a wide range of properties with a minimum of expensive additives.

This invention is directed to an improvement in aqueous dispersion compositions for coating comprising water, emulsifying agent and organic-soluble, water-insoluble cellulosic polymer, said improvement comprising providing said polymer in spherical particles having a number average particle diameter of about from 0.1 to 0.8 micron, at least 70% of said particles being submicron and substantially all of said particles being less than 3 microns in diameter. Preferably the cellulosic polymer is nitrocellulose and substantially all of the partices containing polymer are submicron.

The aforementioned polymer dispersion usually contains plasticizer, coalescing agent or both as made. Although other additives can be added to the basic composition as it is made, conveniently a stock of basic composition is prepared, then later formulated to a variety of final compositions with additional resins, plasticizers, coalescing agents and other additives, the amounts and type of such additives being tailored to each specific end use. Typically the basic composition contains by weight, about from 10 to 70%, and preferably 25 to 45% of cellulosic polymer, about 25 to 80%, and preferably 40 to 60% of water, about from 0.5 to 10%, and preferably 2 to 5% of emulsifier, optionally and preferably up to 30%, and preferably 8 to 12% of plasticizer and up to 30%, and preferably 15 to 30% of coalescing agent, the total of plasticizer and coalescing agent preferably being at least 1% but usually less than 40% of the total basic composition. Typically, other modifying resins other lattices, and other additives have been added thereto, the resulting finished compositions contain, by weight based on the enumerated constitutes.

(a) about from 10 to 40% ( and preferably 20 to 30% of cellulosic polymer,
(b) up to 35% of plasticizer, and usually 10 to 30% of plasticizer or its equivalent,
(c) about from 15 to 80%, and usually 40 to 60% of water,
(d) about from 0.5 to 10%, and preferably 0.7 to 5% of emulsifier,
(e) up to 30%, and preferably 5 to 15% of coalescing agent, and
(f) up to 35%, and preferably 1 to 30% of auxiliary resins, i.e., auxiliary film-forming polymer.

Other optional materials such as colorants, film-forming agents, inhibitors, curing agents, and mixtures of the foregoing alone or with other materials which do not alter the novel and basic characteristics of the compositions also can be added. However, for example, huge proportions of volatile solvents which, for example, decrease the characteristic safety and low cost of the subject compositions, are not used. Although, for precision, the percentages of constituents are based on items (a) to (f), for most practical purposes, and in most preferred final compositions the same ranges apply in substance to the total composition weight including optional additives. Optional additives, other than the aforementioned plasticizers, coalescing agents and auxiliary resins, usually total less than about 25% of the total weight of composition.

The specific proportions of the various ingredients are interrelated and depend on the proposed use of the finished composition. Thus, for example, usually the quantity of plasticizer decreases as the quantity of soft, flexible auxiliary resin increases. Similarly, coalescing agent can be reduced or eliminated if the quantity of plasticizer, particularly of the strong solvent type, is increased. Usually the weight ratio of plasticizer or its equivalent (i.e., plasticizer plus soft resin) to cellulosic polymer is about from 1:5 to 2:1 and usually 3:2 and the total weight ratio of cellulosic polymer plus plasticizer or its equivalent to water is less than about 2:1.

The compositions of this invention are prepared by forming an oil-in-water emulsion of the aforementioned cellulosic polymer, water, emulsifier, and usually plasticizer or coalescing agent in volatile solvent boiling between about from 50 to 140° C. and distillable from the system at below 100° C., and preferably below 95° C., passing the resulting product through a high-shear mixing device which maintains an attrition zone having a peripheral velocity of at least about 1000 feet per minute, and distilling the volatile solvent from the emulsion. Usually, during the distillation, the weight ratio of polymer plus plasticizer to water is maintained at less than about 2:1 and preferably 3:2.

The emulsion compositions of the present invention can be prepared by mixing any plasticizer to be used, the volatile solvent, water, and emulsifier, to form an oil-in-water emulsion. This emulsion is combined wtih the cellulose derivative and the mixture is stirred until the cellulose derivative is a part of the emulsion. Preferably, the cellulose derivative and any plasticizer are dissolved in all or a portion of the volatile solvent before incorporation into an emulsion with the water, emulsifier, and plasticizer. Preferably, mixing of the constitutents is done directly in the high-shear mixer. After the emulsion containing the cellulosic polymers has been formed, it is held in the high-shear mixer until a requisite particle size is attained, then the volatile solvent is distilled off, either alone or as an azeotrope with water while agitation is continued. The weight ratio of cellulose derivative plus plasticizer to water usually is maintained below about 2:1. This weight ratio is maintained at no more than 2:1 by either returning the water distilled off with the volatile solvent by use of a conventional water-separator or by adding sufficient water during the distillation of the volatile solvent to maintain the aforesaid ratio. This product represents the basic coating composition.

The proportions of materials which must be employed in forming the initial emulsion in order to yield basic compositions having the above overall formulation varies depending upon the particular constituents employed and their relative volatilities. In general, with the preferred nitrocellulose compositions, the initial emulsion contains about from 1 to 15% of plasticizer, about from 7 to 35% of water, about from 0.1 to 5.0% of emulsifier, about from 0 to 15% of coalescing agent and about from 25 to 75%, and preferably 30 to 50%, of volatile solvent.

The compositions of the present invention which contain plasticizer and coalescing agent preferably are prepared by adding the plasticizer and coalescing agent to the solution of cellulosic polymer in volatile solvent before emulsification or immediately before distillation of the volatile solvent or after distillation of the volatile solvent. If added after distillation of the volatile solvent mixing should be continued until the coalescing agent is uniformly incorporated into the coating composition.

When other additives are used they can be added at any of the same times that the coalescing agent is added but not necessarily concurrently with the coalescing agent. If the additives are added to the basic composition after it has been prepared, preferably they first are dispersed in water, plasticizer or coalescing agent.

The compositions of this invention are prepared in a high shear mixer which maintains an attrition zone having a peripheral velocity of at least about 1000 feet/min. and preferably about from 7000 to 25,000 feet/min. Mixing for about from 15 to 45 minutes gives emulsified spherical particles having a number average particle size of about 0.1 to 0.8 micron and containing the cellulosic polymer, substantially all the particles having a diameter of less than 3 microns, and at least about 70%, and preferably substantially all of the particles having a diameter of less than 1.0 micron.

Reference to the polymer-containing particles as being "spherical particles" means that substantially all of the particles, i.e., all except for a few chance particles, are substantially round or globular and not irregularly shaped, grossly elongated, fractured or fibrous. "Polymer in particles," "particles containing polymer" or the like refer to the fact that in the final compositions, and preferably in the basic composition, the particles may contain part of all of the plasticizer, coalescing agent, or both and the aforementioned sizes apply to the particles containing these additives. The size of the polymer-containing spherical particles in the compositions of this invention is determined by diluting the compositions with distilled water in the approximate proportion of 1:30, respectively. A drop of this diluted composition is spread on a glass plate and slowly and carefully dried under an infrared lamp. This slide is then transferred to a vacuum evaporator and coated under vacuum with a layer of carbon 500 A. thick. The carbon is evaporated by passing a strong electric current between spectroscopically pure carbon rods contacting each other at their pointed ends. In order to increase the contrast of the replica, a small length of platinum-10% palladium alloy wire is wrapped around the points of the carbon electrodes and evaporated at the same time. After the evaporation and carbon deposition, the slide is scribed with a needle to form a pattern of 3 x 3 mm. squares. The carbon film is then floated off the slide by immersing it in distilled water. Pieces of film floating on water are picked up on standard electron microscope specimen support copper grids and washed in acetone to dissolve the nitrocellulose-containing particles leaving a negative replica of the original particles. The specimens are then transferred to the electron microscope and photographed. The magnification of the microscope can be established by calibrating it with a replica of a diffraction grating having a known number of lines per unit length. The negatives obtained are further magnified five times in a photographic enlarger. The diameter of a large number of particles is measured and the corresponding particle size calculated from the known magnification of the electron micrographs. Further details of the above replication method are described, e.g., in "The Electron Microscope" by M. E. Haine, Interscience Publishers, New York, page 230 (1961).

The high shear mixer used should be of the type wherein a considerable degree of high speed agitation and shearing action is obtained. This is accomplished by establishing an attrition zone in the mill, repeatedly passing the emulsified nitrocellulose particles through this zone which subjects the particles to disaggregation and abrasion as the particles rub against each other and against the edges of the mixer.

The peripheral velocity of the agitator which establishes this attrition zone should be at least about 1000 feet per minute. Any velocity higher than this can be used but, in general, velocities above 25,000 feet per minute are very difficult to attain.

The preferred high-shear mill for use in this process from the standpoint of speed and efficiency of obtaining the desired product is that described in U.S.P. 2,628,081, issued Feb. 10, 1963 to Thomas J. Laird and the disclosure of that patent is hereby incorporated for reference. This mill has a stator with a rotor disposed within, said stator having narrow vertical slots through which the material being dispersed is thrown at high speed during operation. An impeller which turns with the rotor is disposed above the rotor and outside the stator. This impeller serves the purpose of drawing emulsion down from the main body of the fluid into the stator where it is forced through the narrow slots into the main body of emulsion again. The peripheral speed of the rotor should be at least 1000 feet per minute as indicated hereinbefore.

Other types of high-shear mills which can be used for making the prodcct of the present invention are the Cowles dissolver, the operation of which is described in U.S.P. 2,767,170, issued October 16, 1956; the Eppenbach Homomixer; the Manton-Gaulin Colloid Mill; the Gaulin Homogenizer; and others meeting the requirements given hereinbefore.

The cellulose derivatives used as film forming agents in the process of the present invention are soluble in organic solvents and include polymeric cellulose esters and ethers such as cellulose acetate, cellulose nitrate (commonly called nitrocellulose), cellulose acetate benzoate, cellulose acetate crotonate, cellulose acetate butyrate, cellulose sorbate acetate, benzyl cellulose, ethylcellulose, benzyl cellulose acetate, and mixtures of one or more of the aforementioned cellulosic polymers. The preferred compositions contain nitrocellulose having about from 10.8 to 12.2% nitrogen as the film-forming agent. The cellulose derivative forms about from 1 to 20% of the composition before removal of the volatile solvent and about from 10 to 70% after removal. The preferred nitrocellulose content is about from 25 to 45% of the total basic composition.

The nitrocelluise used in the present invention can have a viscosity of, for example, about from ⅛ to 500 seconds, but preferably has a viscosity of about ¼ to 6 seconds, as determined by the ASTM Standard Method D–301–56. Cellulose acetate having an acetyl content of from 36 to 42%, and preferably from 38 to 40 and a viscosity of from 3 to 125, and preferably from 3 to 30 seconds as measured by ASTM Method D–401–56 is illustrative of cellulose acetate used in this invention. The cellulose acetate butyrate can have, for example, an acetyl content of from 6 to 30%, preferably 12 to 22 and a butyryl content of 15 to 50%, and preferably 25 to 40. It preferably has a viscosity of at least 3 seconds as determined by ASTM Method D–1343–54T in the solution described as Formula A, ASTM Method D–871–54T. A viscosity of about from 10 to 30 seconds is especially preferred. The ethyl cellulose preferably has an ethoxyl content of from 43 to 50%, and especially from 46 to 49% and a viscosity of between 5 to 250 centipoises, and especially between 20 to 30 centipoises in 5% solution in 80:20 toluene-ethanol by weight. Cellulose propionate can have a propionyl content of, for example, up to 67%, but preferably has a propionyl content of from 63 to 65%.

Nitrocellulose is generally sold commercially in an alcohol- or water-wet form for safety reasons. It can be used in the process of the present invention in either of these forms without drying. If the nitrocellulose is water-wet an appropriate compensation for the quantity of water in the nitrocellulose is made when adding the remainder of the water present in the composition. If the nitrocellulose is alcohol-wet the alcohol merely is an additional ingredient which is removed during distillation of the volatile solvent.

The plasticizers for the cellulose derivative include any liquid or solid, melting below about 70° C. and boiling above 250° C., which will dissolve the cellulose derivative at a 1 to 1 weight ratio of 100° C. The plasticizer must not form an azeotrope (e.g., with water, or with the aforementioned low-boiling solvent) which boils below about 120° C. and which contains more than 10% of the plasticizer. Naturally, the nature of useful plasticizers will vary with the cellulose derivative being used but preferably the plasticizer should dissolve the cellulose derivative under the conditions mentioned hereinbefore. In the broad aspects of the invention, any one or more of the conventional plasticizers for the aforementioned polymers can be used. If desired, non-solvent plasticizing materials, both resinous and non-resinous, can be employed provided the mixture of solvent and non-solvent plasticizing materials meets the above 1:1 solvency criteria or large proportions of coalescing agent are used.

Examples of the preferred solvent-type plasticizers for nitrocellulose are: Diisobutylcarbinyl phthalate, dioctyl phthalate, tricresyl phosphate, "Santicizer" 131, diethyleneglycol monolaurate, dipentaerythritol hexapropionate, 2-methoxyethyl acetyl ricinoleate, tributyl aconitate, "Santicizer" 130, trioctyl phosphate, cresyl phenyl phosphate ("Santicizer" 140), butoxyethyl diglycol carbonate, acetyl tributyl citrate, triethylene glycol pelargonate, butyl diglycol carbonate, dioctyl phenyl phosphate, dibutyl phthalate, polyethylene glycol di-2-ethylhexoate, triethylene glycol di-2-ethylbutyrate, tributyl tricarballylate, and dibutyl sebacate.

Plasticizers for ethyl cellulose include: tricresyl phosphate, dimethyl phthalate, diethyl phthalate, dibutyl phthalate, dioctyl phthalate, triamyl citrate, dimethoxy ethyl phthalate, and dibenzyl sebacate. Plasticizers for cellulose acetate include the following: dimethyl phthalate, diethyl phthalate, dimethoxy ethyl phthalate ("Methox"), triacetin, diamyl tartrate, and dibutyl tartrate. Plasticizers for cellulose acetate butyrate include dioctyl phthalate, dibutyl phthalate, dimethyl phthalate, diethyl phthalate, ethyl phthalyl ethyl glycollate, triacetin, and tributyrin.

In order to get a good film on drying finished coating compositions of the present invention it is usually necessary to have a weight ratio of plasticizer and coalescing agent to organic-soluble cellulose derivative of at least 0.33, and to prevent undue softness of the film obtained, the weight ratio of plasticizer to cellulose derivative should not be more than 1.5.

The volatile solvent for the cellulose derivative is a solvent boiling below about 140° C. and above 50° C. at atmospheric pressure. If the solvent boils above 100° C. and usually 95° C., it must form an azeotrope, which boils about between 50° C. and 100° C., and preferably 50 to 95° C., with water or other solvent present. Mixtures of suitable solvents can also be used. In this case every volatile organic solvent in the mixture must be capable of being removed by distillation below about 100° C. and preferably 95° C.

Suitable solvents include, for example, acetone, isopropyl acetate, tetrahydrofuran, ethyl acetate, methyl ethyl ketone, n-propyl acetate, methyl acetate, ethyl butyl ketone, acetyl-t-butyl methyl ether, isobutyl acetate, mesityl oxide, methyl isoamyl ketone, methyl isobutyl ketone, methyl n-butyl ketone, methyl n-propyl ketone, n-butyl acetate, sec-butyl acetate, diisobutyl ketone, diacetone alcohol, amyl acetate, 1-methylisoamyl acetate and other aliphatic, cycloaliphatic and aromatic ethers, esters, ketones and alcohols.

Emulsifiers for preparing the finishes of the present invention are anionic emulsifiers either alone or mixed with up to about an equal quantity or more of non-ionic emulsifiers. Emulsifiers of these classes are described in "Detergents and Emulsifiers—Up to Date," 1963, John W. McCutcheon Inc.

Examples of emulsifiers include alkaryl sodium sulfonates such as "Nacconol" NRSF, "Sulframin" L, "Sulframin" NAB, "Santomerse" SX, "Santomerse" E, "Santomerse" 85 (dodecylbenzene sodium sulfonate), "Ultrawet" 30DS, 68KN, 60L, 35KK, SK, "Oronite" S; alkyl sulfates such as "Duponol" C (sodium lauryl sulfate), sodium oleyl sulfate, sodium stearyl sulfate, "Teepol," "Duponol" ME, "Alcoterge," sodium cetyl sulfate, "Conco" Sulfate WA (sodium lauryl sulfate), "Dehydag" Wax E, "Nopco" 1477; alkyl aryl polyether sulfates such as "Triton" 770, X–301 and 202; amide sulfonates such as "Stepanol" AM, "Stepanol" Me; sulfated alkylol amides such as sulfated cocomonoethanol amide (Bull. soc. chim. France 1952, 476–80); phosphate esters such as "Gafac" RE (polyoxyethylene nonyl phenol particularly esterified with phosphoric acid), "Tergitol" P–28 (sodium di(2-ethylhexyl)phosphate), "Victamuls" 20, 24C, 27, 89; esters of polyphosphoric acids such as $Na_5R_5(P_3O_{10})_2$ where R is a $C_8$ radical such as capryl or 2-ethylhexyl ("Victawets" 35B and 58B), ester and ether-linked sulfonates such as "Igepon" AC–78 (coconut oil acid ester of sodium isothionate), dialkyl sodium sulfosuccinates ("Aerosol" OT-di-2-ethylhexyl sodium sulfosuccinate).

Examples of non-ionic emulsifiers which can be used in conjunction with the anionic detergents in proportions up to 50% or more by weight of the total emulsifier include polyethenoxy ethers of alkyl phenols such as "Igepals" RC–760, DM–710, DM–730 and RC–520 (alkylphenoxy-poly(ethylenoxy)ethanols); polyethenoxy ethers of fatty alcohols such as "Tergitols" 3A3, 3A6 and 3A9 (polyoxyethylated tridecyl alcohol); polyethenoxy esters such as "Teox" 120 (polyethenoxy tallate); polyethenoxy mercaptans such as "Penetrant" 100; polyethenoxy glycols such as the "Tweens" (polyoxyethylene sorbitan monolaurate, monopalmitate, monostearate, monooleate and trioleate); glycol esters such as the "Spans" (sorbitan monolaurate, monopalmitate, monostearate, tristearate, monooleate and trioleate); organic phosphate esters such as the "Victamuls"; and amine-acid condensates such as lauric acid-isopropanol amine condensates or stearic acid-diethanolamine condensate.

In the preferred embodiment of the invention coalescing agents are also present in the formulation to produce a clearer film. Coalescing agents are liquids having a boiling point between 120 and 230° C., and usually between 130 and 230° C. and a relative rate of evaporation of between 0.01 and 0.5, and usually 0.01 and 0.3 referred to butyl acetate as 1.0 (determined by Shell Thin Film Evaporator at 0% relative humidity at 25° C.—Paint and Varnish Production 46, No. 12, November 1956) which exert solvent action on the cellulose derivative. These coalescing agents can be added after distillation of the volatile solvent with suitable mixing to incorporate it into the emulsion.

Examples of coalescing agents include methyl "Cellosolve," butyl "Cellosolve" acetate, diethylene glycol, "Cellosolve," butyl "Carbitol," methyl amyl acetate (2,4-dimethylbutyl acetate), methyl amyl ketone, diisobutyl ketone, isophorone, diacetone alcohol, "Cellosolve" acetate, ethyl lactate, and methyl "Carbitol." Glycol esters and ethers are particularly preferred.

In addition to one or more of each of the types of ingredients listed heretofore, the emulsion finishes of the present invention can contain other conventional additives including, for example, colorants, other film-forming materials, inhibitors, curing agents, freeze-thaw stabilizers, and water-dispersible polymeric emulsion stabilizers. Auxiliary resins which can be incorporated as modifying agents include rosin and resin acids; rosin-modified phenolics; phenolic resins; glycerol, glycol and diethylene glycol esters of resin acids; toluenesulfonamide-formaldehyde resins; urea-formaldehyde resins; coumarone-indene resins; dewaxed shellac; sandarac; dewaxed dammar; master gum; "Aroclor" 5460; short-oil coconut-oil phthalic alkyd resins such as "Rezyl"-99-5; acrylic polymers; and esterified carbohydrates such as sucrose benzoate and sucrose acetate isobutyrate. Colorants including phthalocyanine pigments and inorganic pigment such as carbon black, titanium dioxide, lead chromate, iron oxide, zinc oxide, cadmium oxide, antimony oxide and chromium oxide are useful at levels of about 6% to about 25% based on the nitrocellulose present. Other additives include small proportions of waxes such as beeswax, candelilla, glyco wax, Japan wax, montan wax, curicuri wax, spermaceti wax, opalwax, tallow carnuba; fatty acids such as stearic acid, linseed oil fatty acids, glyceryl esters of fatty acids, castor oil fatty acids; aromatic hydrocarbons such as terphenyl (o, m, or p) naphthalene, anthracene; alcohols such as lauryl alcohol, cetyl alcohol, "Zonyl" RP (a fluoro compound) and others. Some of the substances are used to make lower cost systems with minimum sacrifices of film properties and some as flexibilizers.

The nature of the additives that can be usefully added to the emulsion finishes of the present invention without severe impairment of the strength is governed primarily by the compatibility of the additive in the finished film, i.e., whether or not they exude from the finished film, precipitate from the finished film, or form a cloudy or hazy film. The present invention comprises the use of compatible mixtures of cellulose derivatives in the emulsion finishes. Because of this, additives that are normally incompatible with any single cellulose derivative can sometimes be used by including a second cellulose derivative more compatible with the additive or by adding another mutually compatible additive. For example, asphalts or paraffin waxes can be incorporated into ethyl cellulose with which they are incompatible by adding mutual blending agent such as beeswax, stearic acid, dibutyl phthalate, or stearyl alcohol.

Antioxidants also can be included in the compositions of this invention. Examples of suitable antioxidants are secondary amines such as diphenylamine, phenyl-β-naphthylamine, dicyclohexylamine, phenolic derivatives such as hydroquinone, monobenzyl ether, hexyl catechol, benzyl catechol, p-tert-butylcatechol, p-phenylphenol, syringic acid, gallic acid, and vanillyl alcohol; other nitrogenous compounds such as diphenyl guanidine, o-tolyl biguamide, phenyl methyl pyrazolone, and carbazole may be used. When used, antioxidants range about from 0.025 to 2% based on the weight of cellulose derivative. Although not necessary or preferred, water-dispersible emulsion stabilizers including water-soluble carbohydrate-modified acrylic polymers such as "Carbopol" 934 and cellulosic polymers such as sodium carboxymethyl cellulose, methyl cellulose and hydroxyethyl cellulose, for example, in amounts of 0.05 to 1% of the total composition, also can be added.

The coating compositions of this invention can be applied to any of the conventional fluid coating techniques including flow, dip, spray, brush and roller coating techniques and dried for example, at room temperature to 150° C. and preferably 60° C. to 100° C. for 15 to 30 minutes.

The compositions of this invention are useful in coating metal, wood, paper, fabric, plastic, fiber, etc. They can be applied directly to substrates over conventional primers such as alkyd resin primers, aminoplast primers, and alkyd-modified nitrocellulose lacquer primers. The compositions of this invention can be used in coating plastic films such as those of polymers and copolymers of olefins such as polypropylene and polyethylene, of haloolefins such as polyvinyl chloride and polyvinyl fluoride of polyesters such as polyethylene terephthalate and of acrylonitrile. The compositions of this invention are characterized by their freedom from large portions of volatile organic solvent, by their safety and ease of application, and by their high solids content, hence, high coating thickness per pass.

The compositions made by the technique of the present invention give films which compare favorably in most properties with films made by solvent casting and have the advantage that the volatile solvent has been eliminated. Surprisingly, the films made from compositions of the present modifications of the invention are considerably better in abrasion resistance than solvent-base films. Such improved abrasion resistance is of high importance for lacquers for automobiles, floors and many other uses. The compositions of this invention are also unique in that they yield clear films with a minimum of plasticizer coalescing agent and other costly solvent-type additives.

The coating compositions of the present invention are described by the following examples in which parts and percentages, where given, are by weight.

Example 1

(a) To a water-jacketed pot from a Type "L" laboratory Kady Mill, 1000 parts of isopropyl acetate, 122 parts dibutyl phthalate, and 44 parts butyl "Cellosolve" acetate are charged. The Kady Mill creates an attrition zone having a peripheral velocity of between 7,000 and 25,000 ft./min. While agitating this solution with the Kady Mill, 286 parts HB 14 W NC nitrocellulose containing 30% total volatiles are added. After NC dissolution is complete (approx. 3–5 min.), a solution consisting of 575 parts deionized water, 20 parts anionic phosphate ester emulsifying agent ("Gafac" Re–610), and 8 parts of 10% sodium hydroxide is added. Maximum agitation (18,000 r.p.m.) is maintained for 20 minutes. The resultant milky-white opaque oil-in-water emulsion is concentrated to 52.5% nonvolatile material by distilling off the isopropyl acetate and a part of the water in a Rinco Thin-Film evaporator at 45° C. and a vacuum of 26–28 in. of Hg.

The final product has uniform spherical particles, ranging in size from 0.2 micron to 0.8 micron, with the largest amount averaging, i.e., most of the particles being about 0.4 micron.

(b) Another run is made using identical reactants, but using 400–500 r.p.m. paddle-type agitation and an emulsion stabilizer rather than high-shear mixing to yield a mixture of rods and spheres whose sizes range from 0.6 micron to 5.0 micron, with the largest amount averaging 1.5 microns. Particle size is determined by electron photomicrographs as described hereinbefore.

The following table shows a comparison of free film properties obtained with air-dry coatings from (a) the products of Example 1, (b) the products made using the identical ingredients of Example 1 but no high-shear mixing, and (c) a conventional solvent-dissolved lacquer.

| Property | Run Number | | |
|---|---|---|---|
| | Sub-micron | Large micron | Solvent cast |
| Tensile Strength (p.s.i.) | 2,200 | 1,200 | 2,360 |
| Elongation (percent) | 3.5 | 2.5 | 3.3 |
| MIT Flexibility (Folds to Failure) | 28 | 20 | 38 |
| Hardness (Sward Rocker) [1] | 16 | 9 | 10 |
| Abrasion Resistance (Cycles to Failure) [2] | 235 | 170 | 69 |

[1] Canadian Government Specification Board IGP-116.
[2] U.S. Federal Specification TTP-18.

Examples 2 through 35

Water-borne coating systems are prepared by the following technique using the quantities of ingredients listed in the following table:

(a) The cellulose derivative is dissolved in the solvent, plasticizer, coalescing agent, and modifying agent, if used, on the Kady Mill.

(b) The water and emulsifier system are added to the solution in the Kady Mill and agitated until an oil-in-water emulsion is formed.

(c) The stable emulsion is concentrated in the vacuum Rinco Thin-Flm evaporator until the desired nonvolatile content is obtained.

In each final composition the content of polymer, plasticizer, emulsifier, and auxiliary resin is substantially that indicated and there is almost no volatile solvent. The amount of water and coalescing agent are somewhat lower but, in all cases, (except where otherwise indicated) the finished composition contains about 10 to 38 of nitrocellulose, 0.5 to 10 of emulsifying agent, 15 to 75 of water, 0 to 33 of plasticizer, 0 to 20 of coalescing agent and 0 to 33 of auxiliary resin. (In the attached table, values in parentheses indicate the composition of the finished product in parts.) In all cases the dispersed particles containing nitrocellulose have a number average particle size of about 0.2 to 0.8 and are substantially all submicron.

| Ex. No. | Water, parts | Solvent, wt. parts | Emulsifying Agent, wt. parts | Cellulose Derivative (b), wt. parts | Plasticizer, wt. parts | Modifying Resins, wt. parts | Coalescing Agent, wt. parts |
|---|---|---|---|---|---|---|---|
| 2 | 325 (148) | Isopropyl Acetate, 500 (0) | "Gafac" RE-610 (a), 10 (10) | NC-HC 8, 100 (100) | Dibutyl Phthalate 60 (60) | | Butyl "Cellosolve" Acetate (d), 22 (22). |
| 3 | 325 (148) | do | "Gafac" RE-610, 10 (10) | NC-HC 17, 100 (100) | do | | Butyl Cellosolve" Acetate, 22 (22). |
| 4 | 325 (148) | do | do | NC-HB 14, 100 (100) | do | | Do. |
| 5 | 325 (148) | do | do | NC-HA 5, 100 (100) | do | | Do. |
| 6 | 325 (148) | do | do | NC-HA 17, 100 (100) | do | | Do. |
| 7 | 325 (146) | do | Dupanol ME, 8 (8) | NC-HB 14, 100 (100) | do | | Do. |
| 8 | 325 (140) | do | Zelec NE, 2.5 (2.5) | NC-HB 14, 100 (100) | do | | Do. |
| 9 | 325 (146) | do | Aerosol OT/(c) "Tween" 20, 5/3 (5/3) | NC-HB 14, 100 (100) | do | | Do. |
| 10 | 325 (146) | do | "Gafac" PE-510, 8 (8) | NC-HB 14, 100 (100) | do | | Do. |
| 11 | 325 (148) | do | "Gafac" RE-610, 10 (10) | NC-HB 14, 100 (100) | Diisobutyl Adipate, 60 (60) | | Do. |
| 12 | 165 (148) | Isopropyl Acetate, 666 (0) | do | NC-HB 14, 100 (100) | do | | Do. |
| 13 | 400 (148) | Isopropyl Acetate, 500 (0) | do | NC-HB 14, 100 (100) | do | | Do. |
| 14 | 325 (232) | Isopropyl Acetate, 500 (0) | do | NC-HB 14, HA 17, 50/50 (50/50) | Dibnyl Phthalate, Castor Oil, 65/57 (65/57) | | Do. |
| 15 | 600 (190) | Isopropyl Acetate, 600 (0) | do | NC-HB 14, 100 (100) | Dibutyl Phthalate 50 (50) | "Elvax" 40 (f), 50 (50) | Butyl "Cellosolve" Acetate, 20 (20). |
| 16 | 360 (200) | Isopropyl Acetate, 465 (0) | "Gafac" RE-610, 10.5 (10.5) | NC-LB 14, 100 (100) | Dibutyl Phthalate 51 (51) | Krumbbaar 1717 HMB(g), 60 (60) | Do. |
| 17 | 360 (172) | Isopropyl Acetate, 500 (0) | do | NC-LB 14, 100 (100) | do | Krumbbaar 1717 HMB, 30 (30) | Do. |
| 18 | 320 (170) | Isopropyl Acetate, 500 (0) | "Gafac" RE-610, 10 (10) | NC-HB 14, 100 (100) | Dibutyl Phthalate 60 (60) | | |
| 19 | 336 (247) | do | "Gafac" RE-610, 7 (7) | NC-HB 14, 100 (100) | Dibutyl Phthalate, 20 (20) | Plasticizing Alkyd Resin (j), 80 (80) | Butyl "Cellosolve" Acetate, 70 (66.5). |
| 20 | 336 (235) | do | do | NC-HB 14, 100 (100) | Dibutyl Phthalate, 20 (20) | Hard Rosin Ester (i), 20 (20) | Methyl "Cellosolve" Acetate, 70 (65). |
| 21 | 336 (235) | do | "Aerosol" OT/7; "Tween" 20, 11 (18) | NC-HC 17, 100 (100) | Dibutyl Phthalate, 40 (40) | Plasticizing Alkyd Resin (h), 80 (80) | Methyl "Carbitol" Acetate, (e), 65 (65). |
| 22 | 640 (109) | do | "Gafac" RE-610, 4 (4) | NC-HA 17, 100 (100) | Dibutyl Phthalate, 35 (35); Castor Oil, 78 (78) | Plasticizing Alkyd Resin (h), 100 (100) | Butyl "Cellosolve" Acetate, 70 (70). |
| 23 | 336 ( 81) | do | "Aerosol" OT, 23 (23) | NC-HC 17, 100 (100) | Dibutyl Phthalate, 26 (26) | | Methyl "Carbitol", 49 (49). |
| 24 | 336 (140) | do | "Gafac" RE-610, 21 (21) | NC-HC 17, 50 (50) | | Plasticizing Alkyd Resin (h), 125 (125) | Methyl "Carbitol", 85 (85). |
| 25 | 336 (328) | do | "Gafac" RE-610, 7 (7) | NC-HC 17, 50 (50) | Dibutyl Phthalate, 22 (22) | Hard Maleic Resin (j), 270 (270) | Methyl "Carbitol", 86 (86). |
| 26 | 336 (113) | do | do | NC-HB 14, 100 (100) | Dibutyl Phthalate, 20 (20) | | Butyl "Cellosolve" Acetate, 70 (54). |
| 27 | 336 (129) | do | do | NC-HB 14, 100 (100) | Dibutyl Phthalate, 20 (20) | | Methyl "Carbitol", 65 (65). |
| 28 | 336 (117) | do | do | NC-HB 14, 100 (100) | Butyl Acetyl Ricinoleate, 35 (35) | | "Cellosolve" Acetate, 200 (101). |
| 29 | 336 (169) | Isopropyl Acetate, 600 (0) | do | NC-HB 14, 100 (100) | | | |
| 30 | 336 ( 36) | do | do | NC-HB 14, 100 (100) | Dibutyl Phthalate, 40 (40) | | Butyl "Cellosolve" Acetate, 70 (54). |
| 31 | 1,000 (796) | do | do | NC-HB 14, 100 (100) | Dibutyl Phthalate, 97 (97) | | |
| 32 | 336 (119) | do | do | NC-HB 14, 100 (100) | | | |
| 33 | 336 ( 69) | do | "Gafac" RE-610, 18 (18) | NC-HB 14, 100 (100) | | | |
| 34 | 336 ( 60) | Isopropyl Acetate, 500 (0) | "Gafac" RE-610, 40 (40) | NC-HB 14, 100 (100) | Dioctyl Phthalate, 40 (40) | Plasticizing Alkyd Resin (h), 80 (80) | Butyl "Cellosolve" Acetate, 60 (54). |
| 35 | 740 (714) | Isopropyl Acetate, 1,000 (0) | "Gafac" RE-610, 4.8 (4.8) | NC-HB 14, 100 (100) | Dibutyl Phthalate, 28 (28) | Hard Maleic Resin, 20 (20) / Plasticizing Alkyd Resin (i), 48 (48) | Methyl "Carbitol", 58 (58). |

(a)–(j)—See notes at end of specification.

If an equal weight of ethylcellulose (46.8–48.5 ethoxyl content, 22 cp. in 5% soln.) cellulose acetate, or cellulose acetate butyrate (26% butyryl content, 20.5% acetyl) is substituted for the nitrocellulose in Example 2 above, stable, high-solids coating compositions which form clear, smooth coatings are obtained.

Examples 36 to 49

Three nitrocellulose dispersions, denoted (a), (b) and (c) below, are prepared by dissolving 100 parts of nitrocellulose in 400, 450, and 600 parts of isopropyl acetate respectively, and then blending with a solution of 7 parts of "Gafac" RE–610, 2.8 parts of 10% sodium hydroxide and 334 parts of water. The blend is run through a Kady Mill as shown in Example 1, then the isopropyl acetate is evaporated therefrom to yield a dispersion of particles of nitrocellulose having the following sizes:

|  | Percent particles smaller than specified diameter | | |
|---|---|---|---|
|  | Sample (a) | Sample (b) | Sample (c) |
| Diameter ($\mu$): | | | |
| 2.0 | 100 | 100 | 100 |
| 1.0 | 73 | 93 | 100 |
| 0.8 | 48 | 84 | 100 |
| 0.6 | 34 | 71 | 99 |
| 0.4 | 20 | 54 | 93 |
| 0.2 |  | 28 | 65 |
| Number average Diameter ($\mu$) | 0.86 | 0.48 | 0.22 |

Coating compositions are prepared by mixing the basic nitrocellulose compositions described above with a resin emulsion and a plasticizer-coalescing agent emulsion. The resin emulsion is prepared from the following materials:

| | Parts by weight |
|---|---|
| Alkyd resin—100% solids ("Rezyl" 99) | 800 |
| Hard rosin ester ("Cellolyn" 104) | 200 |
| Emulsifier solution (25% neutralized "Gafac" RE–610 in H₂O) | 280 |
| Water | 670 |

The emulsifier solution is prepared by dissolving 400 parts "Gafac" RE–610 in 1146 parts deionized water, followed by adding 54 parts of 50% aqueous NaOH. The pH is then adjusted to 7.0 by addition of 10% NaOH. The alkyd and rosin esters are placed in a metal container and heated to 110°–120° C. The mixture is slowly agitated as the resins become fluid. A few small lumps may persist, but these can be removed later by filtration. The neutralized "Gafac" solution is added slowly while continuing the *slow* agitation. Temperature drops to 50–60° C. The emulsion which forms is of a paste-like consistency and is initially the water-in-oil type. The remaining water is added slowly. Incremental additions may cause a sudden increase of the agitator speed until the water is absorbed. Emulsion inversion to the oil-in-water type occurs at about 65% solids and is accompanied by a drop in viscosity. Addition of all the water specified in the table gives a 55% solids, low viscosity emulsion which is readily filtered through a coarse "Sonco" paint strainer. The finished resin emulsion is now free of lumps and contains particles of submicron size.

The plasticizer coalescing agent emulsion is prepared by agitating plasticizer and coalescing agent with water and 25% neutralized "Gafac" RE–610 solution in the ratios listed in the following table under "Plasticizer-Coalescent Emulsion." For simplicity the table lists the total water present and "Gafac" RE–610 is listed on a 100% solids base.

Finished compositions of this invention are prepared by blending the nitrocellulose dispersion, resin emulsion and plasticizer-coalescing agent emulsion, in ratios corresponding to the total weight ratio of ingredients as listed in the following table.

Films are formed from the finished compositions by doctoring onto glass with a 5 mil blade and allowing to dry for 1 hour at room temperatures.

The quality of the films is rated on an arbitrary scale from 1 to 4, 1 representing films having no visual defects and 4 being hazy films containing small specks.

| | | Composition, Parts by Weight | | | | | | | | | | |
|---|---|---|---|---|---|---|---|---|---|---|---|---|
| | | Nitrocellulose (NC) Dispersion | | | Resin Emulsion | | | | Plasticizer-Coalescent Emulsion | | | |
| Ex. No. | Sample | NC | "Gafac" RE–610 (a) | H₂O | Alkyd Resin (h) | Rosin Ester (i) | "Gafac" RE–610 (a) | H₂O | DBP (k) | BCA (d) | "Gafac" RE–610 (a) | H₂O | Quality of Film |
| 36 | (a) | 100 | 7 | 129 | 80 | 20 | 7 | 88 | 20 | 80 | 2 | 41 | 3 |
| 37 | (a) | 100 | 7 | 129 | 80 | 20 | 7 | 88 | 20 | 90 | 2 | 18 | 2 |
| 38 | (a) | 100 | 7 | 129 | 80 | 20 | 7 | 88 | 20 | 100 | 2 | 18 | 2 |
| 39 | (a) | 100 | 7 | 129 | 80 | 20 | 7 | 88 | 20 | 110 | 2 | 18 | 2 |
| 40 | (a) | 100 | 7 | 129 | 80 | 20 | 7 | 88 | 20 | 120 | 2 | 18 | 2 |
| 41 | (a) | 100 | 7 | 129 | 80 | 20 | 7 | 88 | 20 | 130 | 2 | 38 | 1 |
| 42 | (b) | 100 | 7 | 110 | 80 | 20 | 7 | 88 | 20 | 70 | 2 | 18 | 2 |
| 43 | (b) | 100 | 7 | 110 | 80 | 20 | 7 | 88 | 20 | 80 | 2 | 41 | 2 |
| 44 | (b) | 100 | 7 | 110 | 80 | 20 | 7 | 88 | 20 | 90 | 2 | 18 | 2 |
| 45 | (b) | 100 | 7 | 110 | 80 | 20 | 7 | 88 | 20 | 110 | 2 | 18 | 1 |
| 46 | (b) | 100 | 7 | 110 | 80 | 20 | 7 | 88 | 20 | 110 | 2 | 18 | 1 |
| 47 | (c) | 100 | 7 | 127 | 80 | 20 | 7 | 88 | 20 | 60 | 2 | 18 | 4 |
| 48 | (c) | 100 | 7 | 127 | 80 | 20 | 7 | 88 | 20 | 70 | 2 | 18 | 1 |
| 49 | (c) | 100 | 7 | 127 | 80 | 20 | 7 | 88 | 20 | 80 | 2 | 18 | 1 |

(a), (d), (h), (i), (k)—See notes at end of specification.

The above examples show that the particle size in nitrocellulose dispersion Sample (a) is about the maximum useful in accordance with the invention and that at smaller particle sizes the highest quality coatings are obtained at much lower coalescing agent levels.

NOTES

To tables in Examples 2–49

(a) Complex organic phosphate ester, free acid form.

(b) Du Pont nitrocellulose grades:

HC–17 11.9% N, 5.0 sec. viscosity by ASTM D–301–56 at 25% concn.

HB–14 12.2% N, 3.0 sec. viscosity by ASTM D–301–56 at 20% concn.

HA–5 12.0% N, 5.0 sec. viscosity by ASTM D–301–56 at 12.2% concn.

MB–14 11.4% N, 4 sec. viscosity by ASTM D–301–56 at 20% concn.

LB–14 11.1% N, 14 sec. viscosity by ASTM D–301–56 at 20% concn.

(c) "Aerosol" OT and "Tween" 20-di - 2 - ethylhexyl sodium sulfosuccinate and polyoxyethylene sorbitan monolaurate.

(d) Butyl "Cellosolve" acetate

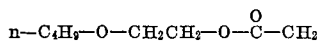

(e) Methyl "Carbitol"

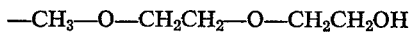

(f) "Elvax"–40 copolymer of vinyl acetate and ethylene.
(g) "Krumbbaar" 1717 HMB—ketone-ester resin.
(h) "Rezyl" 99 alkyd resin 100% solids.
(i) "Cellolyn" 104 hard rosin ester.
(j) "Arochem" 520.
(k) Dibutyl phthalate.

I claim:

1. In aqueous dispersions for coating comprising water, oil-in-water emulsifying agent and organic-soluble, water-insoluble cellulosic polymer, the improvement which comprises providing said polymer in spherical particles having a number average particle diameter of about from 0.1 to 0.8 micron, at least 70% of said particles being submicron and substantially all of said particles being less than 3 microns in diameter.

2. A composition of claim 1 wherein said particles are substantially all submicron and said polymer is nitrocellulose.

3. A composition of claim 2 consisting essentially of, by weight, about from 10 to 70% by weight of nitrocellulose, about from 25 to 80% of water and about from 0.5 to 10% of oil-in-water emulsifier.

4. A composition of claim 3 containing up to 30% by weight of at least one of plasticizer and coalescing agent.

5. A composition of claim 2 consisting essentially of, by weight based on enumerated ingredients, (a) about from 10 to 40% of nitrocellulose,
(b) up to 30% of plasticizer,
(c) about from 25 to 80% of water,
(d) about from 0.5 to 10% of oil-in-water emulsifier,
(e) up to 30% of coalescing agent, and
(f) up to 35% of compatible auxiliary resins, the weight ratio of plasticizer and coalescing agent to nitrocellulose being at least 0.33.

6. In the process for preparing aqueous dispersions for coating comprising dispersing organic-soluble, water-insoluble cellulosic polymer in water containing oil-in-water emulsifier, the improvement which comprises dissolving said polymer in volatile organic solvent therefor, boiling between about 50 and 140° C. and distillable from the system below about 95° C., and emulsifying the resulting solution in said water in a high-shear mixing device which maintains an attrition zone having a peripheral velocity of at least about 1000 feet per minute, said emulsification being continued until the emulsified particles containing said polymer have a number average particle diameter of about 0.1 to 0.8 micron, at least 70% thereof being submicron and substantially all less than 3 microns in diameter, and distilling said volatile solvent from the system.

7. A process of claim 6 wherein particles containing nitrocellulose are passed through said high-shear mixing device until they are substantially all submicron.

References Cited

UNITED STATES PATENTS

| | | | |
|---|---|---|---|
| 2,563,708 | 8/1951 | Crane | 106—170 |
| 2,658,002 | 11/1953 | Schwefsky | 106—170 |
| 2,740,723 | 4/1956 | Voris | 106—170 |
| 2,792,314 | 5/1957 | Brown | 106—170 |
| 2,843,582 | 7/1958 | Voris | 106—170 |
| 2,843,583 | 7/1958 | Voris | 106—170 |
| 3,220,865 | 11/1965 | Coney | 106—170 |
| 3,198,645 | 8/1965 | Plunguian | 106—170 |

ALLAN LIEBERMAN, Primary Examiner

U.S. Cl. X.R.

106—173, 195; 260—13, 14, 15, 16, 17